US006816866B2

(12) United States Patent
Weber

(10) Patent No.: US 6,816,866 B2
(45) Date of Patent: Nov. 9, 2004

(54) METHOD OF CHANGING A PARAMETER OF AN OPERATING SYSTEM OF A COMPUTER SYSTEM

(75) Inventor: Joachim Weber, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/845,140

(22) Filed: Apr. 30, 2001

(65) Prior Publication Data

US 2001/0054039 A1 Dec. 20, 2001

(30) Foreign Application Priority Data

May 3, 2000 (EP) ............................................. 00109415

(51) Int. Cl.[7] .................................................. G06F 17/30
(52) U.S. Cl. ........................................................ 707/101
(58) Field of Search ............................... 707/101, 100, 707/102, 104, 2, 204; 717/115; 455/560; 345/501; 706/45

(56) References Cited

U.S. PATENT DOCUMENTS

| 5,249,260 | A | * | 9/1993 | Nigawara et al. | 706/45 |
| 5,452,417 | A | * | 9/1995 | Randall et al. | 345/501 |
| 5,506,986 | A | * | 4/1996 | Healy | 707/204 |
| 6,131,190 | A | * | 10/2000 | Sidwell | 717/115 |
| 6,141,565 | A | * | 10/2000 | Feuerstein et al. | 455/560 |
| 6,195,652 | B1 | * | 2/2001 | Fish | 707/2 |

* cited by examiner

Primary Examiner—Sanjiv Shah
(74) Attorney, Agent, or Firm—William A. Kinnaman, Jr.

(57) ABSTRACT

A method of changing a parameter of an operating system of a computer system is described. All requested values of the parameter are stored in a history database. A new resolved value is created by a history manager depending on these requested values and a desired new value of the parameter. The structure and the relationship of the parameter is stored in a schema.

15 Claims, 3 Drawing Sheets

METHOD OF CHANGING A PARAMETER OF AN OPERATING SYSTEM OF A COMPUTER SYSTEM

BACKGROUND OF THE INVENTION

1. Field of the Invention

The invention relates to a method of changing a parameter of an operating system of a computer system. As well, the invention relates to a corresponding computer system.

2. Description of the Related Art

Any operating system for a computer system provides the possibility to change a number of configuration parameters in order to adapt the configuration of the operating system to the purpose for which the computer system is used. Such changes are often required by application programs of the computer system. The number of parameters is permanently increasing due to the increasing capabilities of computer systems. Furthermore, the change of a specific parameter often influences other parameters. Therefore, it becomes more and more complex to be aware of all possible parameters and their relationships with other parameters.

SUMMARY OF THE INVENTION

It is an object of the invention to provide a method of changing a parameter of an operating system which allows the consideration of all relationships for all parameters automatically.

This object is solved by a method of changing a parameter of an operating system wherein all requested values of the parameter are stored in a history database and wherein a new resolved value is created by a history manager depending on these requested values and a desired new value of the parameter.

The history manager manages any change of any parameter within the operating system. Thereby, it is ensured that any change of a parameter is performed in the same manner. It is not possible anymore that different methods are used e.g. by different application programs for changing parameters of the operating system.

Furthermore, due to the storage of all requested values of the parameters in the history database, it is ensured that the history manager is always aware of all necessary requirements in connection with the parameters. The history manager, therefore, is always able to create a new value for the parameter to be changed under the consideration of all relevant values.

As well, the invention also provides a very flexible undo capability. The history manager allows one to revert to any previous request in any order.

In an embodiment of the invention, the structure and the relationship of the parameter are stored in a schema. In particular, a treelike structure is stored in the schema. This has the advantage that the structure of the parameters and the requested values of the parameters are stored apart from each other. It is therefore no problem to add a new parameter by defining a desired structure for the parameter and then by initializing a value for the new parameter.

In an embodiment of the invention, the history manager comprises a generic resolver for creating the new resolved value. The generic resolver may comprise a list-end resolver and/or a simple resolver.

Further embodiments and advantages of the invention are described in connection with the enclosed figures.

DESCRIPTION OF THE PREFERRED EMBODIMENT

An operating system like the IBM OS/390 operating system provides a number of configuration parameters which may be changed. By changing these parameters, the configuration of the operating system may be adapted or optimized to the specific purpose of the computer system, on which the operating system runs.

Such changes may be required by application programs which make use of specific services of the operating system. It has to be added that application programs often provide services themselves so that the change of a parameter initiated by an application program may even influence the application program itself. Furthermore, changes of parameters may be performed by the user of the computer system.

Figure 1:
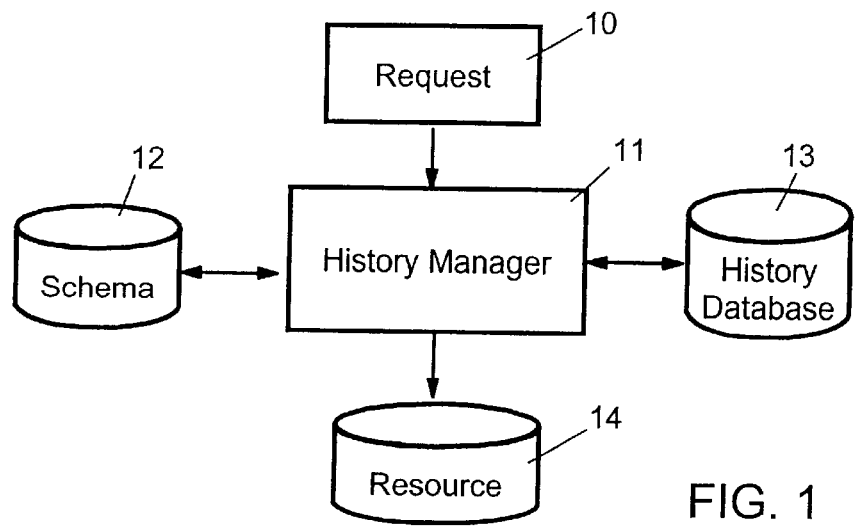
FIG. 1 is a schematic block diagram of a system for managing parameters of an operating system.

In FIG. 1, an application program requires a change of a parameter. According to FIG. 1, this required change is transformed into a request 10. This transformation is done e.g. by the application program itself which initiates the change of the parameter.

The request 10 has a uniform syntax and includes at least an identification of the request, an identification of the parameter and requirements for the resource controlled by the parameter.

Then, the request is provided to a history manager 11. The history manager 11 is the means for managing all parameters of the operating system. Any introduction of a parameter, any change of a parameter as well as any deletion of a value of a parameter is only performed through the history manager 11.

The history manager 11 is able to access a schema 12. This schema 12 provides a description of any parameter which is known in the operating system. It is emphasized that the schema 12 does not include any value for a parameter but only the structures and relationships of the parameters.

Figure 2A:
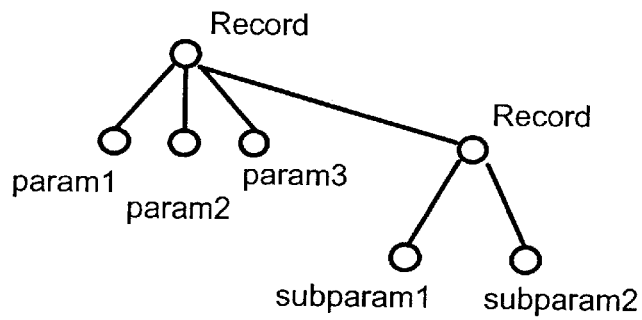
FIGS. 2a and 2b are schematic pictures of examples of descriptions of a parameter.
Figure 2B:
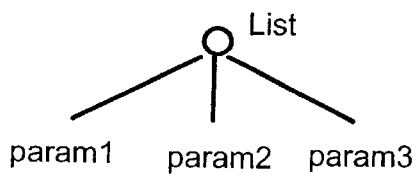

FIGS. 2a and 2b show two examples of the description of parameters. In FIG. 2a, the parameters are structured in a treelike manner with sub-parameters in a lower level. In FIG. 2b, the parameters form a simple list.

The history manager 11 is able to access a history database 13. In this history database 13, the history of all requested values of all parameters of the operating system are stored. It is emphasized that the history database 13 does not include any information concerning the structures or relationships of the parameters. As already described, this information is stored in the schema 12. Insofar, the schema 12 provides only the description of the parameters and the history database 13 provides only the values of the parameters.

Figure 3:
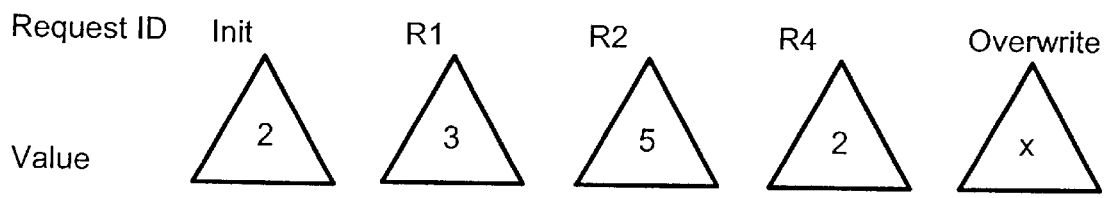
FIG. 3 is a schematic diagram of a specific parameter and the history of its values.

FIG. 3 shows, as an example, a specific parameter with the identification P and the history of its requested values. In a first point in time, the parameter P was initiated. The identification (ID) of this first request is "Init" and the value is "2". Then, in subsequent points in time, requests for changes of the parameter P were present. These requests carry the identifications "R1", "R2", "R4" and have the values "3", "5", "2".

FIG. 3 only shows valid requests and therefore only valid values of the parameter P. A request with the identification "R3" is not present as this request is not valid anymore due to an assumed former deletion of the request.

Finally, a request with the identification "Overwrite" and the value "x" is shown in FIG. 3. The overwrite request is only needed if the user can change a parameter manually without the control of the history manager 11. Such changes are recognized and transformed into an overwrite request. The value "x" is a value manually changed by the user.

Any request 10 which is forwarded to the history manager 11 is processed by the history manager 11 with the help of the schema 12 and the history database 13. In particular, the history manager 11 calculates and/or decides which one of a number of requested values is used as a resulting value for the operating system.

For that purpose, the history manager 11 comprises several value resolvers for calculating and/or deciding the actual value out of a number of requested values. These value resolvers may calculate the new value arithmetically or logically out of the requested values. As well, the value resolvers may decide on the basis of a specific criteria which one of the requested values is selected to be the actual value.

Examples of value resolvers are shown in FIGS. 4a to 4e.

Figure 4A:
FIGS. 4a to 4c are schematic pictures of examples of value resolvers comprised in the history manager of FIG. 1.

In FIG. 4a, a simple resolver is shown which always selects the last requested value as the actual value. Therefore, if the values "A", "B", "C" are present in a list, the simple resolver of FIG. 1 selects the value "C" as the actual value.

Figure 4B:
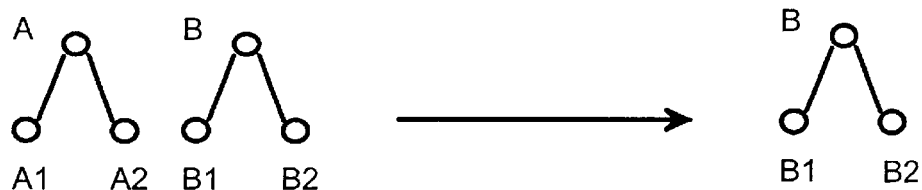

FIG. 4b shows a simple resolver for a treelike structure. In FIG. 4b, the last valid request is selected as the actual value which is the structure "B" with the values "B1", "B2" of FIG. 4b.

Figure 4C:
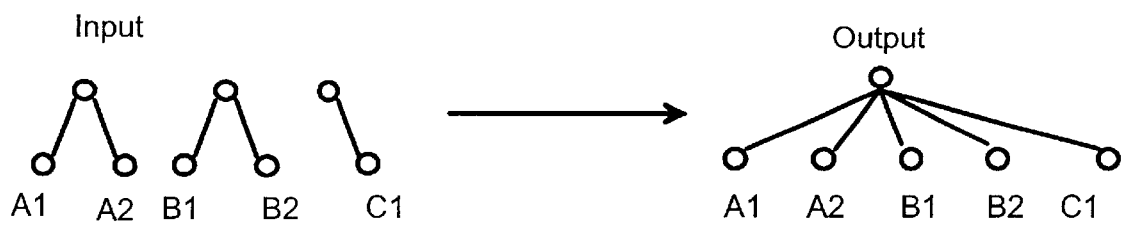

In FIG. 4c, a list-end resolver is shown which always merges a number of input lists into an output list. In FIG. 4c, three lists are given as input lists. The shown list-end resolver creates one output list out of these input lists and selects this output list as the actual list.

Figure 4D:

In FIG. 4d, a maximum resolver is shown which calculates a maximum output value out of the given input values. Therefore, if the values "9", "6", "8" are given as input values, the maximum resolver of FIG. 4d selects the maximum value "9" as the actual output value.

Figure 4E:
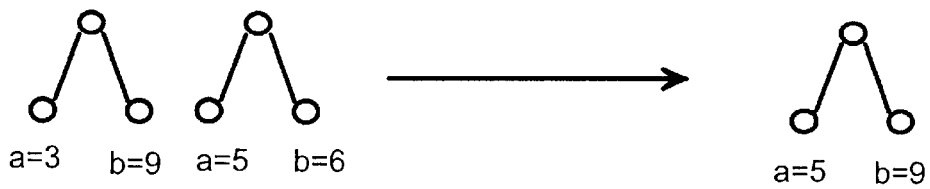

FIG. 4e shows a maximum resolver for a treelike structure. In this case, the maximum output value of all levels of the tree- like structure is calculated by the resolver. In the lower level, the maximum resolver selects the maximum value of "3" and "5" for "a", i.e. "5", and the maximum value of "9" and "6" for "b", i.e. "9", with the result of "5" and "9" as the actual output values.

Figure 5:
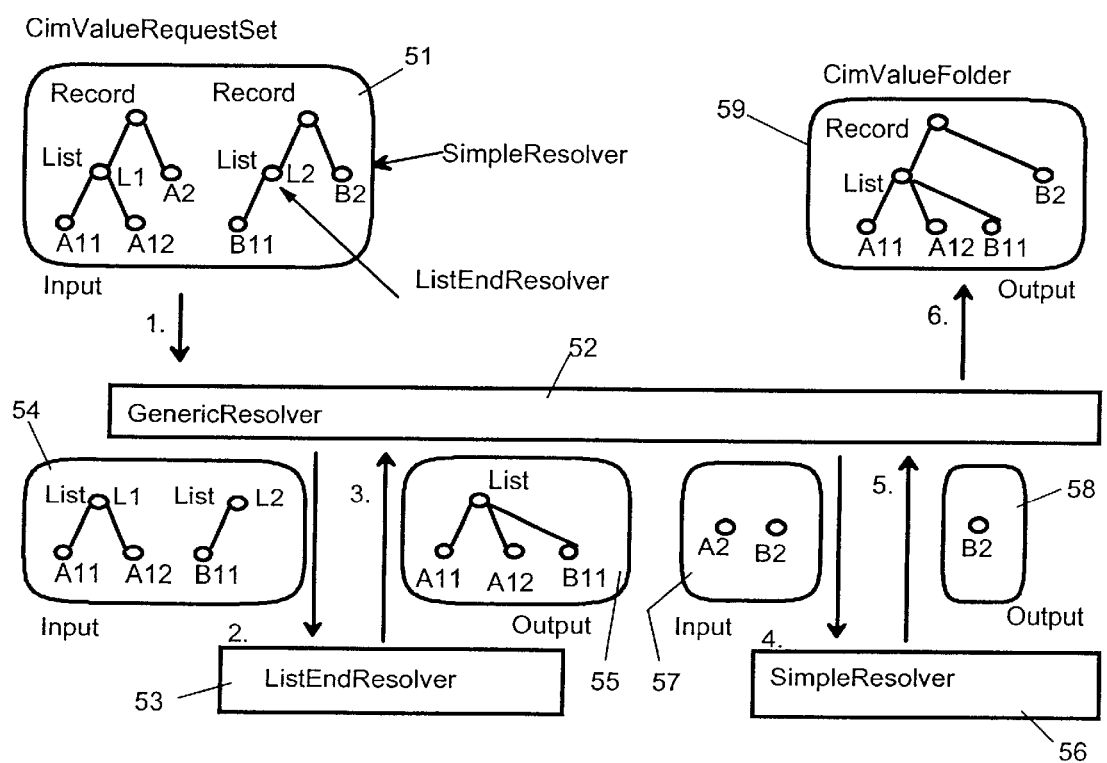
FIG. 5 is a schematic diagram of a method for changing parameters of an operating system performed by the history manager of FIG. 1.

FIG. 5 shows a method of changing parameters of an operating system. This method is performed by the history manager 11 of FIG. 1. The used values in FIG. 5 are only an example.

A first record including the values "A11", "A12", "A2" and a second record including the values "B11", "B2" are present in the history database 13 as input values. Furthermore, the treelike structure of these input values is present in the schema 12. As well, the schema 12 provides the information that the values "A11", "A12", "B11" shall be treated by a list-end resolver, and that the values "A2", "B2" shall be treated by a simple resolver. All this information is shown in block 51 of FIG. 5.

Then, in a first step, a generic resolver 52 is called which is able to manage the necessary further steps for resolving the given input values.

In a second step, the generic resolver 52 provides the values "A11", A12", "B11" to a list-end resolver 53. These values are given in two treelike lists L1, L2 as shown in block 54 of FIG. 5. In a third step, the list-end resolver 53 creates the output list containing the values "A11", "A12", "B11" as shown in block 55 of FIG. 5.

In a fourth step, the generic resolver 52 provides the values "A2", "B2" to a simple resolver 56 which, in a fifth step, creates an output value "B2" out of these input values. The input values are shown in block 57 and the output value is shown in block 58 of FIG. 5.

In a further step, the generic resolver 52 creates an output record which is shown in block 59 of FIG. 5. This output record includes the merged list created by the list-end resolver 53 and the output value created by the simple resolver 56.

If an application program wants to change a current parameter, the request 10 is provided to the history manager 11. Then, the history manager 11 gets the structure and the relationship of the parameter from the schema 12. Furthermore, the history manager 11 gets the requested values of the parameter from the history database 13. These transfers of information to the history manager 11 are based on the identification of the parameter.

Then, the history manager 11 stores the new requested value of the parameter in the history database 13.

Then the history manager 11 creates the input values for the generic resolver 52 including the new requested value. These input values are based, on the one hand, on the information from the schema 12 and the history database 13 and, on the other hand, on the desired new value of the parameter. These created input values are the values of block 51 of the example of FIG. 5.

The generic resolver 52 of the history manager 11 then provides the input values to the respective resolvers, e.g. to the list-end resolver 53, simple resolver 56, etc., and finally creates an output value. This created output value is the value of block 59 of the example of FIG. 5.

The history manager 11 then updates the actual value of the parameter with the resolved output value. According to FIG. 1, the resolved output value is outputted to a resource 14. As a result, the parameter is changed into the resolved output value.

If an application program wants to introduce a new parameter, only one prior step is needed. There, the structure and relationship of this new parameter has to be defined in the schema 12. Then, the history manager 11 will find this description in the schema 12, but will not find any requested value in the history database 13. The history manager 11 then sets the "Init" value equal to the new desired value for the parameter. Then, the same method as described in connection with the change of a present parameter is performed by the history manager 11.

If an application program wants to undo a request for a parameter, the history manager 11 removes the respective requested value from the history database 13. The requested value is identified by the identification of the request. Then, the history manager 11 performs the same method as described in connection with the change of a parameter, however, without the deleted value.

If a user changes a parameter manually without the control of the history manager 11, which is not recommended but tolerated, then this is recognized by the history manager 11 and the desired new value of the parameter is used as the "Overwrite" value. Then, again, the method as described in connection with the change of a parameter is performed by the history manager 11.

The described method, in particular the history manager 11, is realized by a computer program which is part of the operating system of the computer system. The schema 12 may be stored in a memory of the computer system. The history database 13 is stored in a database server that is accessible by the computer system.

What is claimed is:

1. A method of changing a parameter of an operating system of a computer system characterized in that previously requested values of the parameter are stored in a history database and that a new resolved value is created by a history manager depending on the previously requested values and a desired new value of the parameter.

2. The method of claim 1, wherein a previously requested value may be deleted from the history database.

3. The method of claim 1, wherein the parameter has a structure and a relationship that are stored in a schema.

4. The method of claim 3, wherein a treelike structure is stored in the schema.

5. A method of changing a parameter of an operating system of a computer system characterized in that previously requested values of the parameter are stored in a history database and that a new resolved value is created by a history manager depending on the previously requested values and a desired new value of the parameter, wherein the history manager comprises a generic resolver for creating the new resolved value.

6. The method of claim 5, wherein the generic resolver comprises a list-end resolver and/or a simple resolver.

7. A computer program characterized in that it is able to perform the method of claim 1 when the computer program is run on a computer system.

8. A computer-readable media characterized in that it comprises a computer program which is able to perform the method of claim 1 when the computer program is run on a computer system.

9. The method of claim 1, wherein all requested values of the parameter are stored in the history database.

10. The method of claim 1, wherein previously requested values of a plurality of parameters are stored in the history database and wherein a new resolved value of each such parameter is created by the history manager depending on previously requested values of the parameter and a desired new value of the parameter.

11. A computer system comprising an operating system with a parameter which may be changed characterized in that previously requested values of the parameter are stored in a history database and that a new resolved value is created by a history manager depending on these requested values and a desired new value of the parameter.

12. The computer system of claim 11 wherein the parameter has a treelike structure that is stored in a schema.

13. The computer system of claim 12 wherein the schema is stored in a memory of the computer system.

14. The computer system of claim 11, wherein all requested values of the parameter are stored in the history database.

15. The computer system of claim 11, wherein previously requested values of a plurality of parameters are stored in the history database and wherein a new resolved value of each such parameter is created by the history manager depending on previously requested values of the parameter and a desired new value of the parameter.

* * * * *